(12) United States Patent
Janakiraman et al.

(10) Patent No.: US 11,409,610 B1
(45) Date of Patent: Aug. 9, 2022

(54) CONTEXT-DRIVEN DATA BACKUP AND RECOVERY

(71) Applicant: Veritas Technologies LLC, Santa Clara, CA (US)

(72) Inventors: Viswesvaran Janakiraman, San Jose, CA (US); Ashwin Kayyoor, Sunnyvale, CA (US)

(73) Assignee: VERITAS TECHNOLOGIES LLC, Santa Clara, CA (US)

(*) Notice: Subject to any disclaimer, the term of this patent is extended or adjusted under 35 U.S.C. 154(b) by 206 days.

(21) Appl. No.: 16/836,997

(22) Filed: Apr. 1, 2020

Related U.S. Application Data

(63) Continuation of application No. 15/085,222, filed on Mar. 30, 2016, now Pat. No. 10,628,264.

(51) Int. Cl.
*G06F 11/14* (2006.01)

(52) U.S. Cl.
CPC ...... *G06F 11/1451* (2013.01); *G06F 2201/80* (2013.01); *G06F 2201/805* (2013.01); *G06F 2201/84* (2013.01)

(58) Field of Classification Search
CPC ............. G06F 11/1451; G06F 2201/80; G06F 2201/805; G06F 2201/84; G06F 11/1469; G06F 16/128
USPC .................................................. 707/640, 674
See application file for complete search history.

(56) References Cited

U.S. PATENT DOCUMENTS

| | | |
|---|---|---|
| 7,596,570 B1 | 9/2009 | Emigh |
| 8,924,352 B1 | 12/2014 | Andruss |
| 10,606,705 B1 | 3/2020 | Janakiraman et al. |
| 2003/0177324 A1 | 9/2003 | Timpanaro-Perrotta |
| 2009/0177728 A1 | 7/2009 | Pottenger |
| 2011/0313974 A1 | 12/2011 | Chen |
| 2013/0151477 A1* | 6/2013 | Tsaur ............ G06F 11/1469 707/679 |
| 2014/0279921 A1 | 9/2014 | Wolfgang |
| 2014/0372384 A1 | 12/2014 | Long |
| 2015/0039619 A1 | 2/2015 | Zhang |
| 2016/0004605 A1 | 1/2016 | Ahn |
| 2016/0019119 A1 | 1/2016 | Gupta |
| 2016/0188700 A1 | 6/2016 | Kleinschnitz, Jr. |
| 2016/0239486 A1 | 8/2016 | Bianchi |
| 2016/0335283 A1 | 11/2016 | Rabinovich |

(Continued)

OTHER PUBLICATIONS

Janakiraman, Viswesvaran et al.; "Context-Driven Data Backup and Recovery"; U.S. Appl. No. 15/085,222; filed Mar. 30, 2016; consisting of Specification, Claims and Abstract (31 pages); and Drawings (10 sheets).

(Continued)

*Primary Examiner* — Michael Pham

(57) ABSTRACT

Disclosed herein are systems, methods, and processes to perform context-driven (or context-based) data backup and recovery operations. A request to perform a backup operation on a dataset is received. Current external context datasets related to the dataset and generated based on prioritization techniques are collected from computing devices. a saved context dataset is generated based on the current external context datasets. The backup operation is performed by storing a backup image that includes at least a portion of the dataset and the saved context dataset.

20 Claims, 10 Drawing Sheets

(56) References Cited

U.S. PATENT DOCUMENTS

2017/0078208 A1 3/2017 Panin
2018/0285477 A1 10/2018 Bik

OTHER PUBLICATIONS

Khurana, Udayan, University of Maryland, College Park, et al., "Efficient Snapshot Retrieval Over Historical Graph Data," Jul. 24, 2012; 13 pages.

Quepy (/), Transform Natural Language to Database Queries-Demonstration; 2 pages.

\* cited by examiner

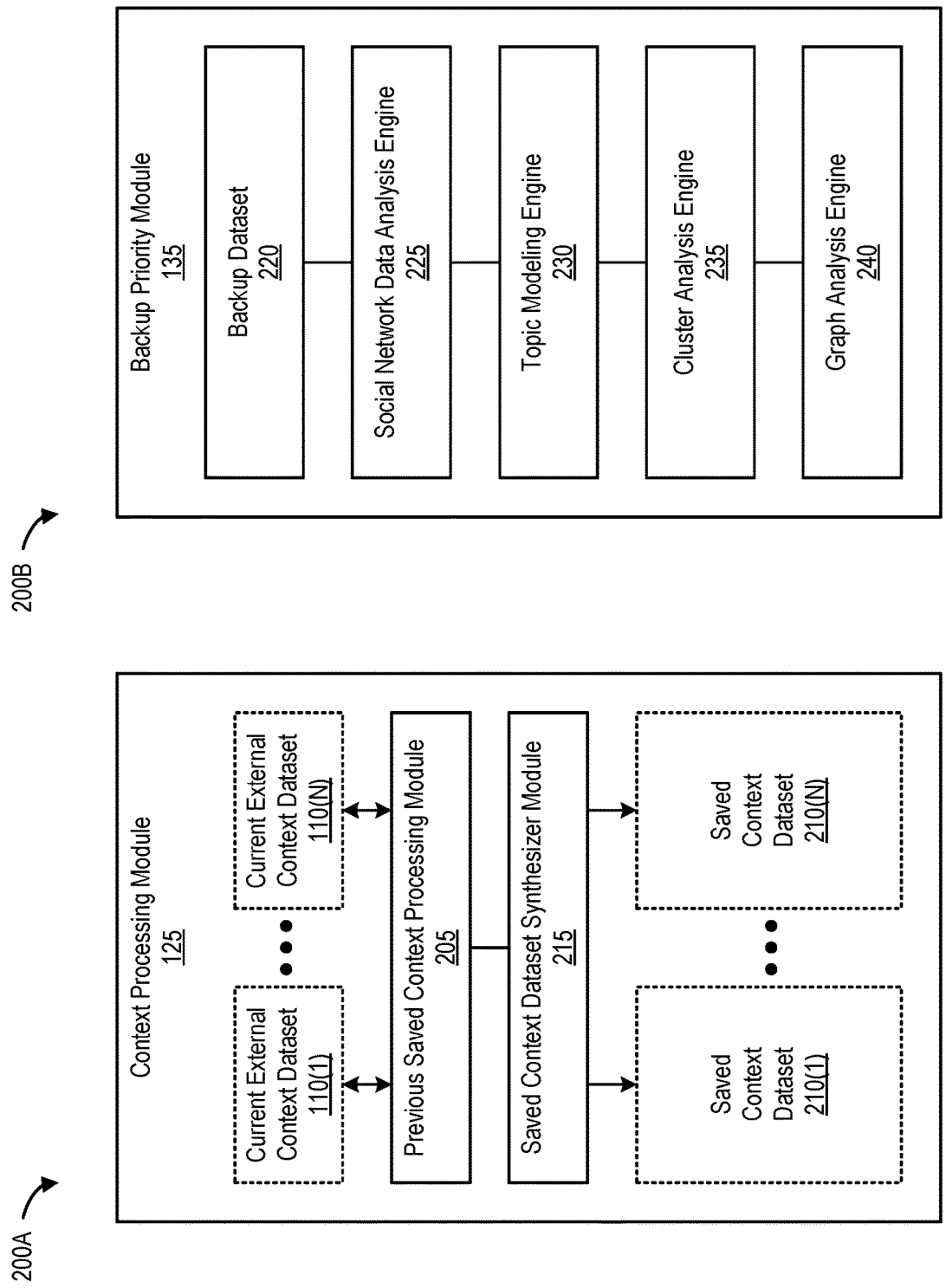

Catalog 130

| Backup Image Identifier Field 245 | Backup Metadata Field 250 | Backup Dataset Field 255 |
|---|---|---|
| 150(1) | 245(1) | 220(1) |
| 150(2) | 245(2) | 220(2) |
| 150(3) | 245(3) | 220(3) |
| 150(4) | 245(4) | 220(4) |
| 150(5) | 245(5) | 220(5) |
| ••• | ••• | ••• |
| 150(N) | 245(N) | 220(N) |

FIG. 2C

Temporal Index 145

| Backup Session Field 260 | Time & Date Field 265 | Saved Context Dataset Field 270 |
|---|---|---|
| 255(8) | 3/15/2016 10:10 am | 210(8) |
| 255(7) | 2/29/2016 8:30 pm | 210(7) |
| 255(6) | 2/15/2016 7:00 am | 210(6) |
| 255(5) | 2/5/2016 4:30 pm | 210(5) |
| 255(4) | 1/31/2015 2:30 am | 210(4) |
| 255(3) | 1/20/2016 6:45 pm | 210(3) |
| 255(2) | 1/10/2016 5:15 am | 210(2) |
| 255(1) | 1/1/2016 11:15 am | 210(1) |

FIG. 2D

CONTEXT-DRIVEN DATA BACKUP AND RECOVERY

CROSS-REFERENCE TO RELATED APPLICATIONS

The present patent application is a continuation of U.S. patent application Ser. No. 15/085,222, filed on Mar. 30, 2016, entitled "Context-Drive Data Backup and Recovery," which is incorporated by reference herein in its entirety and for all purposes.

FIELD OF THE DISCLOSURE

The present disclosure relates to data backup and recovery operations and, more particularly, to context-driven data backup and recovery.

DESCRIPTION OF THE RELATED ART

Companies and/or organizations use backup and recovery software applications typically provided by one or more vendors to perform data backup and recovery operations. A backup operation is designed to protect data against loss and/or corruption. The backed up data can then be recovered and/or restored at a later time by performing a recovery operation.

In certain situations, the need to perform data recovery operations is necessitated by one or more specific business goals. Performing a data recovery operation in conjunction with a specific business goal permits a company and/or organization to recover particular (or specific) data in a targeted and precise manner. For example, recovering the state of an application and the application's data as they existed at a prior point in time, or restoring a set of files exchanged between a group of employees between a particular time interval in the past (e.g., for electronic discovery purposes, and the like), requires information that conveys the understanding and knowledge of the foregoing contextual (and time-based) scenarios.

However, because such contextual scenarios exist independently and externally with no direct connection (or association) to previously backed up data, a backup catalog of a backup system only permits painstaking manual restoration (e.g., by a backup administrator) of a select set of files spanning multiple backup sessions. Such an approach to data recovery is tedious, slow, error-prone, and does not scale.

SUMMARY OF THE DISCLOSURE

Disclosed herein are systems, methods, and processes to perform context-driven (or context-based) data backup and recovery. One such method involves receiving a request to perform a backup operation on a dataset. The method collects current external context datasets from computing devices. The current external context datasets are related to the dataset and are generated based on prioritization techniques. The method generates a saved context dataset based on the current external context datasets. The method performs the backup operation by storing a backup image that includes at least a portion of the dataset and the saved context dataset.

In one embodiment, the method identifies previous saved context datasets. The previous saved context datasets are stored temporally and incrementally as part of previous backup images and are associated with previous backed up datasets. In this example, the method generates the saved context dataset based on a difference between the previous saved context datasets and the current external context datasets.

In some embodiments, the backup operation stores backup metadata associated with the dataset as part of the backup image. The prioritization techniques to generate the current external context datasets include social network data analysis techniques, topic modeling techniques, cluster analysis techniques, or graph analysis techniques.

In certain embodiments, the method generates a temporal index based on the saved context dataset and the previous saved context datasets. The temporal index permits the saved context dataset and the previous saved context datasets to be searched temporally.

In other embodiments, each of the previous saved context datasets are associated with at least one previous backup image generated and stored as part of previous backup operations. In this example, the backup image is stored incrementally along with the previous backup images associated with the previous backup operations. The temporal index maintains mapping information between the saved context dataset and the previous saved context datasets, and the backup image and the previous backup images.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 2A is a block diagram of a context processing module, according to one embodiment of the present disclosure.

FIG. 2B is a block diagram of a backup priority module, according to one embodiment of the present disclosure.

FIG. 2C is a table illustrating a backup catalog, according to one embodiment of the present disclosure.

FIG. 2D is a table illustrating a temporal index, according to one embodiment of the present disclosure.

Figure 1:
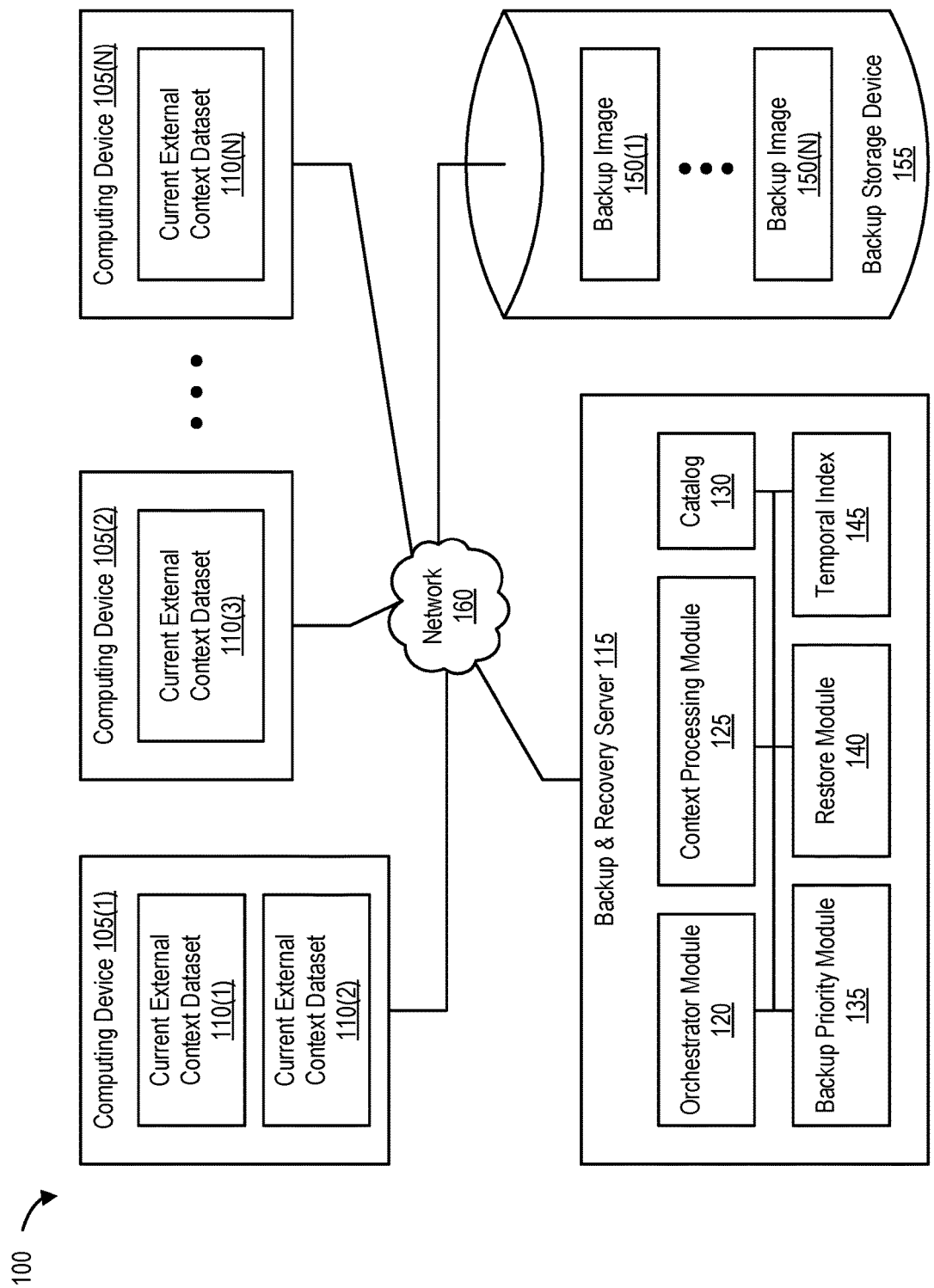
FIG. 1 is a block diagram of a computing system that performs context-based data backup and recovery, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Data recovery involves recovering and provisioning previously-backed-up data in case of loss, data corruption, or some other type of disaster (e.g., resulting in the failure of one or more storage devices, data centers, and the like). Companies and organizations typically use commercially-available backup and restore software applications to recover and restore data. When a backup and restore software application performs data backup and recovery operations, the backup and restore software application is unaware of (or agnostic to) the qualitative nature of the data that is being backed up (and subsequently restored), as well as contextual information related thereto.

As previously noted, companies and/or organizations frequently encounter the need to recover data in a fast and efficient manner (e.g., for electronic discovery purposes, to restore an application and the application's data to the application's previous state, and the like). Given the business-related context of such needs, companies and/or organizations also typically need to recover data to meet a specific business goal (e.g., as noted above, during litigation to fulfill electronic discovery obligations, and the like).

For example, a company and/or organization may be asked to provide (e.g., as part of a discovery request in legal proceedings, investigations by governmental entities, and the like) electronic communications and interactions (e.g., electronic mail, instant messages, and the like) that took place between specific employees during a time period in the past. Recovering data that meets the above stated goals not only demands meticulous planning and manual computing steps (e.g., by a system and/or backup administrator), but also requires information related to context, including that which conveys the understanding and knowledge of the foregoing contextual (and time-based) information.

Therefore, to recover data that meets a specific business goal requires painstaking and time-consuming manual restoration (e.g., by consulting a backup catalog of a backup system and manually restoring data from specific backup sessions), as well as attempting to reconstruct contextual information, which can be impossible in certain situations (and thus, can never be guaranteed). As noted, such an approach to data recovery is tedious, slow, error-prone, and does not scale.

To address the aforementioned problems with restoring data in conjunction with a specific business goal, the importance (and priority) of data that is being backed up and restored needs to be taken into consideration. One such solution can involve preferentially backing up important and/or high-priority subset(s) of data using heuristic technique(s) (also referred to herein as data analysis techniques and/or prioritization techniques). Further, contextual information relating to the environment in which given data exists can itself be the subject of such backup and restore operations.

Therefore, in some embodiments of the present disclosure, selecting preferential data for backup and restore operations involves processing data using one or more prioritization techniques. Such prioritization techniques can include, but are not limited to, social network data analysis techniques, topic modeling techniques, cluster analysis techniques, and/or graph analysis techniques. In a company and/or organization, data can be analyzed using such prioritization techniques by one or more computing devices, and the results of the analyzed data (e.g., priority and/or preferential subset(s) of the analyzed data, also referred to herein as "current context external dataset(s)") can be stored in one or more storage devices.

As noted, the data recovery process in traditional backup and recovery systems lacks business context and is manually intensive. For example, to recover a set of files that were accessed (and modified) by a given set of users (or employees) at a prior point in time requires a backup administrator to manually access and query several backup sessions to reconstruct the past (time-related) context. These backup sessions then have to be narrowed down to restore specific files manually, one at a time.

The foregoing problem arises, in part, because traditional backup systems do not maintain context-related information (e.g., information that is associated with interactions between users during a particular period of time in the past or in the present). Consequently, a backup administrator has to manually interact with the appropriate external collaborators (e.g., users and/or employees) to synthesize such a context and co-relate the results with a backup catalog that includes several recent backup sessions. The backup administrator has to then recover specific files from each backup session. Disclosed herein are systems, methods, and processes to perform automatic context-driven (or context-based) data backup and recovery.

An Example Computing System that Performs Context-Driven Backup and Recovery

FIG. 1 is a block diagram of a computing system 100, according to one embodiment. FIG. 1 includes computing devices 105(1)-(N). As previously noted, each computing device can generate (e.g., using one or more prioritization techniques) and store one or more current external context datasets (e.g., current external context datasets 110(1)-(N)). As shown in FIG. 1, backup and recovery server 115 performs one or more (and one or more types of) backup operations, recovery operations, context processing operations, and/or deduplication operations, and can be any of a variety of different types of computing devices, including a server, personal computing device, laptop computer, cellular phone, or the like.

Backup and recovery server 115 is coupled to computing devices 105(1)-(N) and backup storage device 155 through network 160. Backup storage device 155 stores backup images 150(1)-(N). Backup storage device 155 can include one or more of a variety of different storage devices, including hard disks, compact discs, digital versatile discs, one or more solid state drives (SSDs) memory such as Flash memory, and the like, or one or more logical storage devices such as volumes implemented on one or more such physical storage devices. Backup images 150(1)-(N) include data from backed-up files (deduplicated, incremental, or otherwise), as well as, optionally, contextual information related thereto. Backup and recovery server 115 includes an orchestrator module 120, a context processing module 125, a catalog 130, a backup priority module 135, a restore module 140, and a temporal index 145.

Backup and recovery server 115, computing devices 110(1)-(N), and all or part of backup storage device 155 can be integrated (e.g., where the backup storage device is coupled to a computing device's or backup and recovery server's internal devices by an internal bus and is built within the same chassis as the rest of the node or the backup server) or separate. If separate, for example, computing devices 110(1)-(N), backup and recovery server 115, and backup storage device 155 can be coupled by a local connection (e.g., using a technology such as Bluetooth™, Peripheral Component Interconnect (PCI), Small Computer System Interface (SCSI), or the like) or via one or more networks such as the Internet, a local area network (LAN), or a storage area network (SAN).

Examples of Context-Driven Backup Operations

FIG. 2A is a block diagram of a context processing module, according to one embodiment. In some embodiments, context processing module 125 receives a request to perform a backup operation on a dataset. Context processing module 125 collects (or retrieves) one or more external context datasets from one or more computing devices (e.g., external context datasets 110(1) and/or 110(2) from computing device 105(1)), and/or external context dataset 110(3) from computing device 105(3)). In this example, the current external context dataset(s) are related to and/or associated with the dataset (on which the backup operation is to be performed), and are generated based on one or more prioritization techniques.

As shown in FIG. 2A, context processing module 125 implements a saved context dataset synthesizer module 215. Saved context dataset synthesizer module 215 generates one or more saved context datasets (e.g., saved context datasets 210(1)-(N)) based on one or more current external context datasets. Saved context dataset synthesizer module 215 then performs the backup operation by storing a backup image (e.g., backup image 150(N)) that includes at least a portion of the dataset as well as the (generated) saved context dataset.

Context processing module 125 also includes and implements a previous saved context processing module 205. In one embodiment, previous saved context processing module 205 identifies previous saved context datasets (e.g., previously generated saved context datasets generated based on one or more current external context datasets). In this example, the previous saved context datasets are stored temporally and incrementally as part of one or more previous backup images (e.g., backup images created as part of previous backup operations and associated with one or more previously backed up datasets) or separately (but are related in some manner to one or more previous backup images). Context processing module 125 generates the saved context dataset based on a difference between the previous saved context dataset(s) and the current external context dataset(s). The backup operation performed by backup and recovery server 115 also stores backup metadata associated with the backup dataset as part of the backup image. It should be noted that this backup metadata is separate and distinct from the saved context dataset(s), which are also stored with the backup dataset as part of the backup image.

FIG. 2B is a block diagram of a backup priority module that can be implemented by backup and recovery server 115 to generate one or more current external context dataset(s) prior to performing the context-driven backup (and/or restore) operations discussed herein, according to one embodiment. As previously noted, the prioritization techniques used to generate the current external context datasets can include, but are not limited to, prioritization techniques such as social network data analysis techniques, topic modeling techniques, cluster analysis techniques, and/or graph analysis techniques, as described subsequently.

Backup priority module 135 analyzes backup dataset 220 (e.g., the dataset on which the backup operation is to be performed) using one or more prioritization techniques by way of backup priority module 135 implementing a social network data analysis engine 225, a topic module engine 230, a cluster analysis engine 235, and a graph analysis engine 240. Social network data analysis engine 235 provides one or more social network data analysis techniques, topic module engine 230 provides one or more topic modeling techniques, cluster analysis engine 235 provides one or more cluster analysis techniques, and graph analysis engine provides one or more graph analysis techniques. It should be noted that any of one or more of the foregoing prioritization technique(s) (in addition to one or more other prioritization techniques) may have already been previously applied to backup dataset 220 (e.g., by computing device 105(1) to generate current external context dataset 110(1), and/or by some other computing device and/or user (e.g., at a geographically distant computing site/location)).

Examples of Data Analysis and Prioritization Techniques

In one embodiment, social network data analysis engine 225 can implement a N-Hop neighborhood analysis methodology to analyze social network data (e.g., from a social networking website, among other sources). For instance, a backup dataset containing a company's social network data can be analyzed by social network data analysis engine 225 implementing N-Hop neighborhood analysis to identify a current external context dataset that contains data associated with a given set of executives who communicate frequently with each other, are part of the same corporate department, and so on. It will be appreciated that one or more social network data analysis techniques can be used to analyze social network data.

In another embodiment, social network data analysis engine 225 can analyze social network data (e.g., from a social networking website, or from other data sources) based on a given user's social network circle (e.g., prioritized by family, friends, close friends, business contacts, and/or the like). Social network data analysis engine 225 can generate a current external context dataset based on the user's social network data, and can then use this current external context to prioritize particular data objects (e.g., information regarding relationships, locations, contacts, activities performed etc.) based on this current external context (e.g., identify a current external context dataset that includes information indicating how a user is related to a certain number of people in his/her first circle of his/her larger social network).

In some embodiments, topic module engine 230 can implement a natural language processing (NLP)-based generative model methodology such as Latent Dirichlet allocation (LDA) to analyze data. For example, if a topic of importance includes the word (or topic) called "litigation," topic module engine 230 can implement an LDA-based methodology to analyze a backup dataset to determine whether a subset in the backup dataset with the word "litigation" is attributable to the (desired) current external context's topic (of importance). Because a backup dataset can be a mixture of a number of disparate topics, a topic data analyzer such as LDA can be used to analyze a backup dataset to determine which current external context dataset from the backup dataset is responsive (or attributable) to that particular topic (e.g., "litigation").

In other embodiments, topic module engine 230 can implement other NLP-based data analysis and prioritization techniques associated with topic modeling such as Tokenization, N-Gram analysis, and Cosine (among others). One or more topical modeling techniques (e.g., LDA, N-Gram analysis, and/or Tokenization etc.), can be used. For example, a backup dataset can be analyzed using LDA to identify a current external context dataset based on a certain topic (e.g., "litigation" as noted above), in combination with a lexical analysis technique such as Tokenization to break up a backup dataset into words, phrases, symbols, and the like (based on the topic of importance). A backup dataset can also be analyzed by implementing N-Gram analysis to identify a current external context dataset based on a contiguous sequence of n terms (e.g., a term of importance and/or priority) from a given sequence of text or speech.

In certain embodiments, cluster analysis engine 235 can be used to analyze a backup dataset to identify one or more current external context datasets. For example, cluster analysis engine 235 can implement K-means clustering to analyze a backup dataset by utilizing vector quantization to prototype clustered data based on importance and/or priority (e.g., by partitioning n observations into k clusters, in which each observation belongs to the cluster with the nearest mean). In certain other embodiments, cluster analysis engine 235 can implement other cluster analysis techniques such as Density-based Spatial Clustering of Applications with Noise (DB-SCAN), Balanced Iterative Reducing and Clustering using Hierarchies (BIRCH), Ordering Points to Identify the Clustering Structure (OPTICS), and SUBCLU (among others).

Examples of Incrementally Saving and Temporally Searching Context-Driven Datasets FIG. 2C is a table that illustrates a catalog, according to one embodiment. Catalog 130 maintains metadata (or information) that includes a backup image identifier field 245, a backup metadata field 250, and a backup dataset field 255. Backup image identifier field 245 contains information that identifies one or more backup images that are stored in, for example, backup storage device 155. Backup metadata field 250 maintains metadata related to the contents of each backup image. For example, backup metadata 245(1) includes information identifying the data maintained in backup image 150(1) (e.g., backup dataset 220(1)) such as the size of backup image 150(1), size and offsets of various data segments of backup dataset 220(1), any fingerprinting and/or segmentation algorithms used to segment backup dataset 220(1) and fingerprint the various data segments, the time/date when backup image 150(1) was created and/or modified, and the like.

As previously noted, the backup operation performed by backup and recovery server 115 stores backup metadata associated with a backup dataset as part of a backup image. As also previously noted, in certain embodiments, the backup metadata illustrated in FIG. 2C is separate and distinct from the saved context dataset(s), which are also stored with the backup dataset as part of the backup image (or separately). It will be appreciated that in some embodiments, saved context datasets and previous saved context datasets are stored incrementally to reduce the storage space consumed by such information, while permitting the temporal searching of backup images during restore operations (e.g., by orchestrator module 120).

FIG. 2D is a table that illustrates a temporal index 145, according to one embodiment. In this example, saved context dataset synthesizer module 215 (part of context processing module 125) generates temporal index 145 based on the saved context dataset that is generated as part of a backup operation, and one or more previous saved context datasets that have been generated and stored in one or more backup images as part of one or more previous backup operations. Temporal index 145 permits the saved context dataset and the previous saved context dataset(s) to be search temporally.

As previously noted, backup and recovery server 115 generates (and stores) a saved context dataset based on a context dataset differential. A context dataset differential refers to the difference between a current external context dataset and one or more previous saved context dataset(s). In this manner, backup and recovery server 115 only stores the difference(s) between the current external context of a backup dataset (e.g., as indicated by one or more current external context datasets) and context information that is already present in (or stored as related to) one or more backup images (or as part of one or more previous saved context datasets). It will be appreciated that storing saved context datasets in this incremental manner can provide advantages related to networking and storage (e.g., higher data transmission speeds, lower storage costs, and the like).

In addition to storing saved context datasets in an incremental manner, temporal index 145 also stores information indicating the time and date of each backup operation performed by backup and recovery server 115. Consequently, context processing module 125 can temporally search multiple previous saved context datasets to identify a previous context dataset that meets the temporal (or time-related) goals and/or requirements of a backup and restore operation. For example, electronic mail communications between ten particular employees of a company may be stored as part of multiple backup images. However, because context processing module 125 incrementally stores context-driven information in the form of a saved context dataset (along with a backup dataset) as part of a backup operation, the backup images that contain electronic mail communications that took place between the ten aforementioned employees between, for example, between May and December 2015, can be temporally searched for and automatically retrieved by backup and recovery server 115 (e.g., as part of a recovery operation).

Examples of Context-Driven Recovery/Restore Operations

Figure 3:
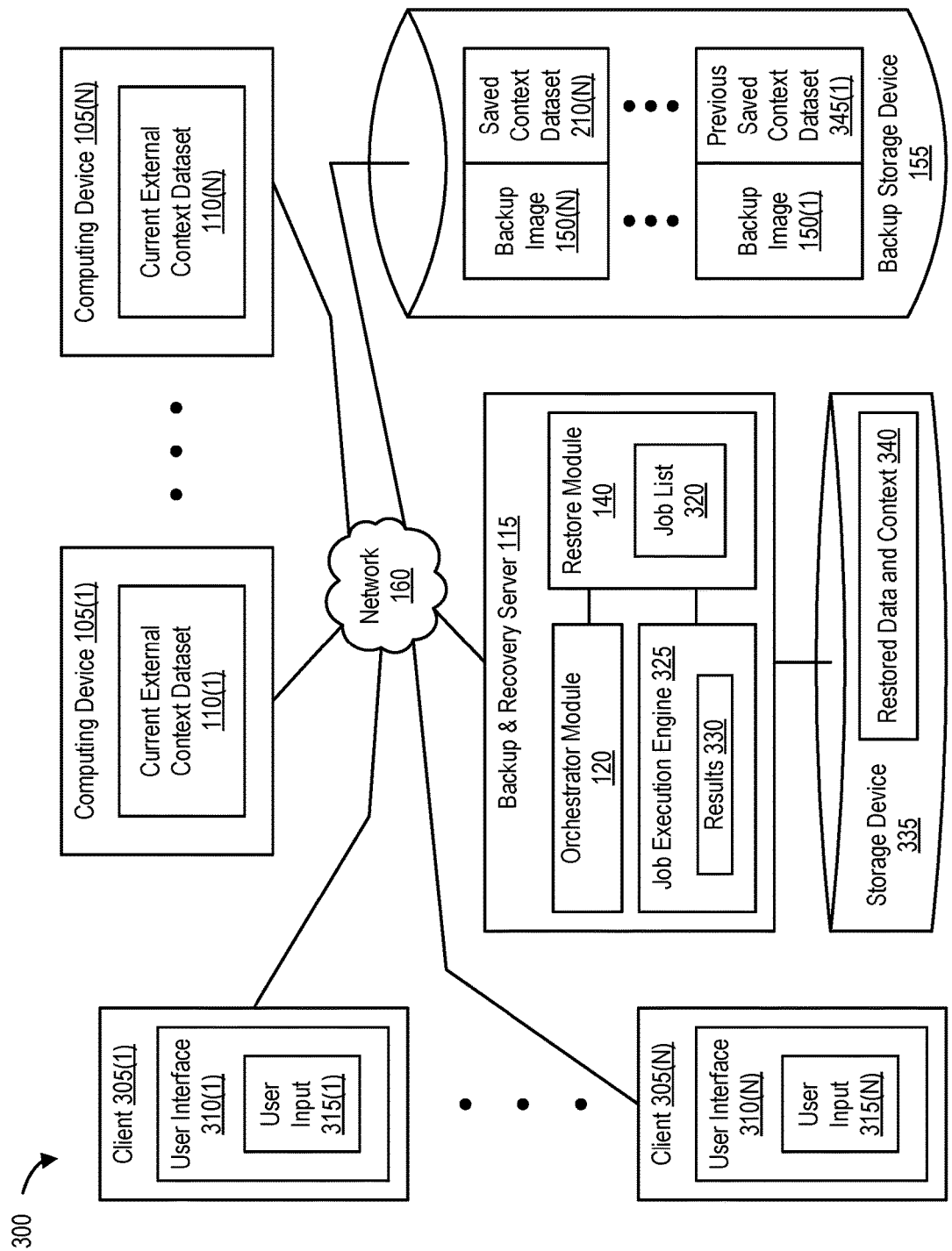
FIG. 3 is a block diagram of a computing system that performs context-driven data backup and recovery, according to one embodiment of the present disclosure.

FIG. 3 is a block diagram of a computing system that performs context-driven data recovery operations, according to one embodiment. A computing system such as that depicted in FIG. 3 (i.e., a computing system 300) includes restore module 140 (implemented by backup and recovery server 115) that can receive a request to perform a recovery operation. For example, user(s) of one or more clients (e.g., clients 305(1)-(N)) can specify a user input (e.g., user inputs 315(1)-(N)) using a user interface (e.g., user interfaces 310(1)-(N)). User input such as user inputs 315(1)-(N) can include a request to restore context-driven (or context-based) data stored on one or more backup images in backup storage device 155 as part of one or more context-driven backup operations. The user input is received by backup and recovery server 115 via network 160.

In one embodiment, user input 315(1) from client 305(1) includes one or more data recovery and/or restore objectives (e.g., specific business goals) expressed in a natural language format (e.g., Structured Query Language (SQL) or a similar language format, and the like) using user interface 310(1). Orchestrator module 120 then parses user input 315(1) and generates a problem statement based on one or more current external context datasets (e.g., current external context dataset 110(1)) and one or more previous saved context datasets (e.g., previous saved context datasets 345 (1)-(N)).

In one example, parsing the natural language query uses natural language processing (NLP) techniques and results in a graph/NLP problem statement that spans graph data in one or more previous saved context dataset(s) (e.g., previous saved context dataset 345(1)) as well as graph data in one or more current external context dataset(s) (e.g., current external context dataset 110(1)). In this example, the graph/NLP problem statement is solved by orchestrator module 120 using one or more prioritization techniques (e.g., by analyzing one or more incrementally constructed and temporally stored previous saved context dataset(s) using one or more graph analysis and/or NLP techniques), and in so doing, creates a job list 320. Job list 320 contains a list of one or more backup images and also identifies one or more files to recover (restore) from a given backup image. It should be noted that catalog 130 and/or temporal index 145 can also be queried by orchestrator module 120 as part of the process of creating job list 320, and the information in catalog 130 and temporal index 145 can be maintained separately, or as part of a single catalog and/or index.

After orchestrator module 120 generates job list 320, orchestrator module 120 submits job list 320 to restore module 140. Restore module 140 then identifies one or more file(s) from one or more backup image(s) identified in job list 320 and submits the results (e.g., results 330) to job execution engine 325. Job execution engine 325 then uses the previous saved context dataset(s) (e.g., based on the sensitivity/importance of files, set of users who interacted and accessed these files from select locations at the time of backup, and the like) as well as the current external context dataset(s) (e.g., a set of users who still work at the company) to arrive at a final list of files that can be recovered by backup and recovery server 115. Recovery module 140 then recovers the files specified in the final list of files from backup storage device 155. The recovered files are then transmitted to the client requesting the restore operation (e.g., client 305(1)), and are optionally stored as restored data and context 340 in storage device 335. It should be noted restored data and context 340 can be restored to any location other than storage device 335, which is shown here just for the purposes of illustration.

For example, a company performs two backup operations on Jan. 1, 2015 (e.g., backup operations A and B) each pertaining to (or relating to) two employees (e.g., backup operation A is related to employees A1 and A2, and backup operation B is related to employees B1 and B2, respectively). The company then undertakes two projects. Project 1 initially involves employees A2 and B1 and project 2 initially involves employees A1 and B2. The current external context dataset at this juncture contains graph data reflecting the interactions between employees A2 and B1, and A1 and B2 with respect to projects 1 and 2, respectively.

On Feb. 1, 2015, a new employee joins the company (e.g., employee A3), is part of backup operation A, and works on project 1. At this point in time, the company performs a backup operation involving all files related to project 1. In this scenario, the current external context dataset is the set of all employees (e.g., A1, A2, A3, B1, and B2), whereas the saved context dataset related to the data being backed up is A2, A3, and B1. Since this is a first backup operation, backup storage device 155 does not contain a previous saved context dataset. Therefore, the entire saved context dataset is backed up by backup and recovery server 155 as part of the backup operation related to project 1. On Mar. 1, 2015, yet another employee (e.g., employee B3) joins the company, is part of backup operation B, and works on project 1. Employee A2 leaves the company.

On Apr. 1, 2015, the company once again performs a backup operation involve all files related to project 1. In this alternate scenario, the current external context dataset is A1, A3, B1, B2, and B3, whereas the saved context dataset is A3, B1, and B3. The context dataset differential between the previous saved context dataset and the current external context dataset is −A2 and +B3. This context dataset differential is applied over the previous saved context dataset in a layered (or incremental) manner (e.g., {A2, A3, B1} is layered incrementally over {−A2, +B3}). Orchestrator module 120 can then query (or view) the saved context dataset in a temporal fashion. A recovery operation request for the state as it existed on Feb. 1, 2015 results in {A2, A3, B1} and a recovery operation request for the state as it existed on Apr. 1, 2015 results in {A3, B1, B3}. Therefore, because the saved context dataset are stored using appropriate data representations (e.g., graph data, topic buckets, and the like) along with a two way link to a catalog and/or temporal index, a single context name space can be analyzed, searched, and clustered using one or more prioritization techniques to generate results for specific queries spanning multiple backup images (or backup sessions) and contexts.

Example Processes to Perform Context-Driven Backup and Recovery

Figure 4:
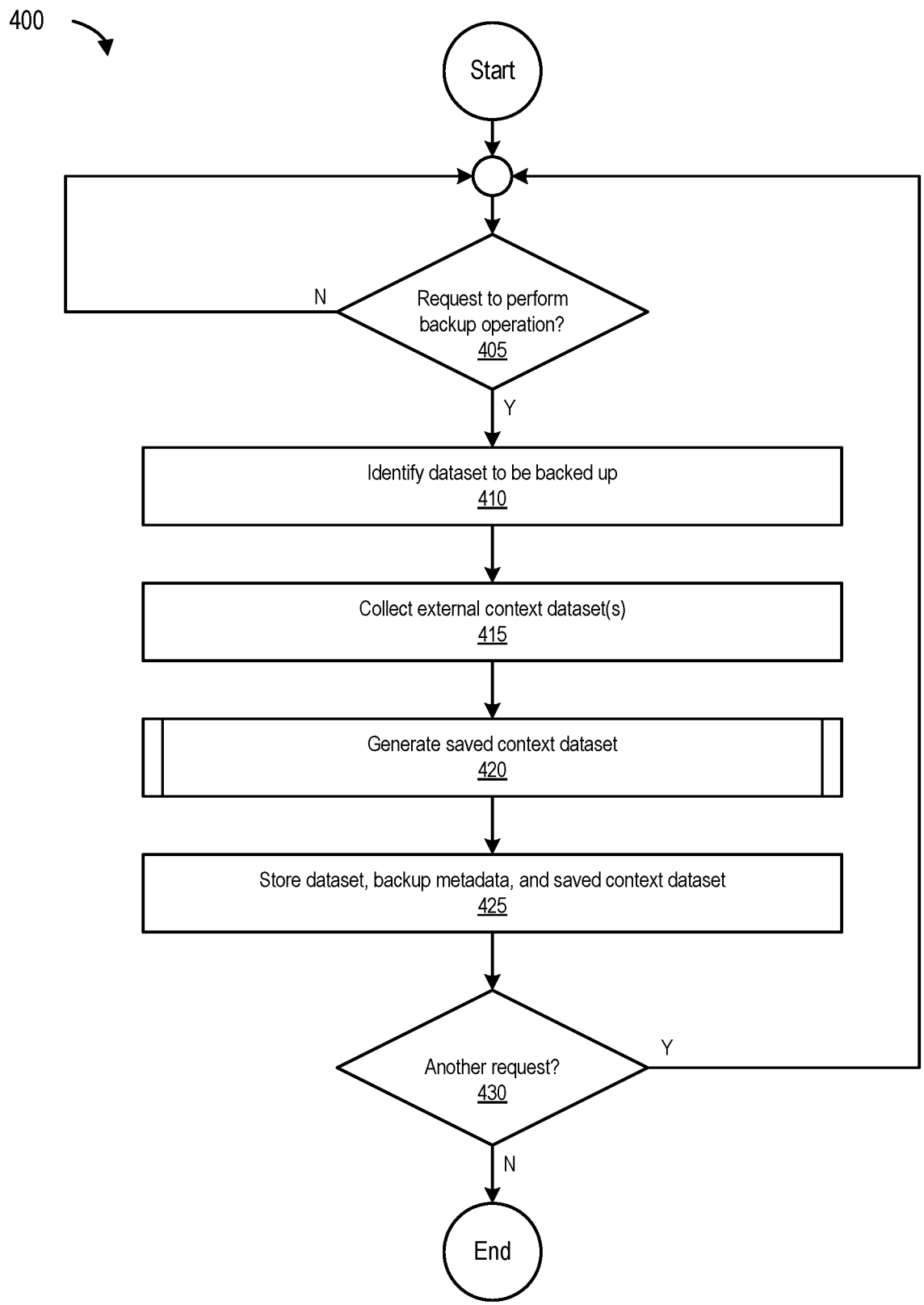
FIG. 4 is a flowchart that illustrates a process for generating a saved context dataset, according to one embodiment of the present disclosure.

FIG. 4 is a flowchart that illustrates a process for generating a saved context dataset, according to one embodiment. The process begins at 405 by determining whether a request to perform a backup operation has been received (e.g., by backup and recovery server 115). At 410, the process identifies a dataset to be backed up (e.g., backup dataset 220). At 415, the process collects (or retrieves), from one or more computing devices, one or more external context datasets. At 420, the process generates (or synthesizes) a saved context dataset (e.g., using saved context dataset synthesizer module 215 implemented by context processing module 125).

At 425, the process stores (backs up) the dataset (e.g., backup dataset 220(1) as shown in backup dataset field 255 in FIG. 2C), backup metadata (associated with the dataset), as well as the saved context dataset (e.g., saved context dataset 210(8) as shown in FIG. 2D) as part of a backup image (e.g., backup session 255(8) as shown in FIG. 2D). In this example, backup image 150(1) is stored on backup storage device 155. The process ends at 430 by determining whether there is another request to perform another backup operation.

Figure 5:
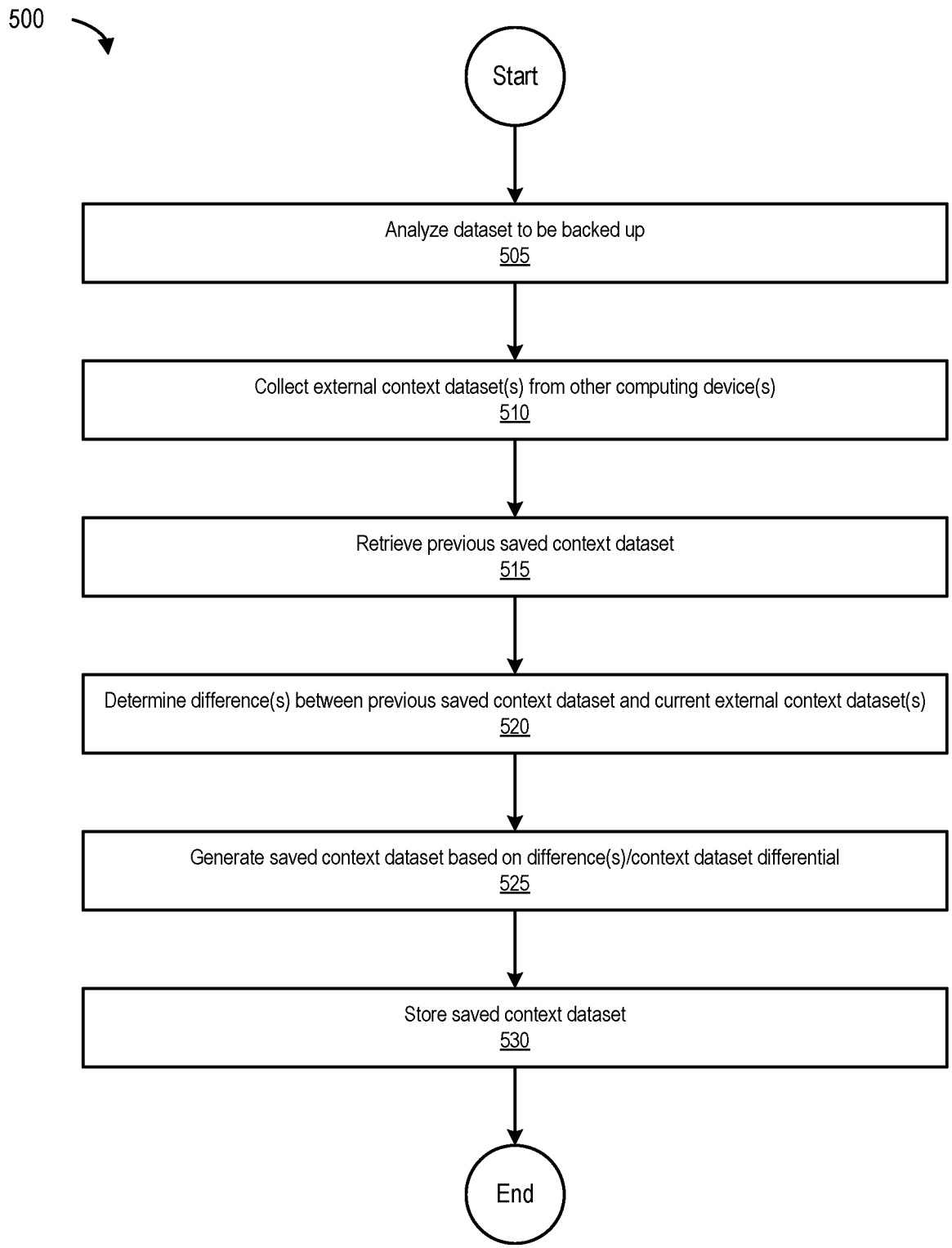
FIG. 5 is a flowchart that illustrates a process for storing a saved context dataset, according to one embodiment of the present disclosure.

FIG. 5 is a flowchart that illustrates a process for storing a saved context dataset (e.g., as part of or in a manner otherwise related to a backup image), according to one embodiment. The process begins at 505 by analyzing a dataset to be backed up. At 510, the process collects (or retrieves) one or more external context datasets from one or more computing devices (e.g., via network 160). For example, an external context dataset with graph data can be collected from computing device 105(1) and another external context dataset with topic data can be collected from computing device 105(2). At 515, the process retrieves previous saved context datasets (e.g., previous saved context dataset 345(1)) from one or more backup images.

At 520, the process determines difference(s) between one or more previous saved context datasets and one or more current external context datasets. At 525, the process generates or synthesizes a saved context dataset (e.g., saved context dataset 220(1)) based on the difference(s) (e.g., context dataset differential). The process ends at 530 by saving the saved context dataset as part of a backup image (along with the backup dataset and backup metadata). Once the saved context dataset is saved as part of the backup image, backup and recovery server 115 updates catalog 130 and/or temporal index 145 to reflect the new composition of the backup image in backup storage device 155.

Figure 6:
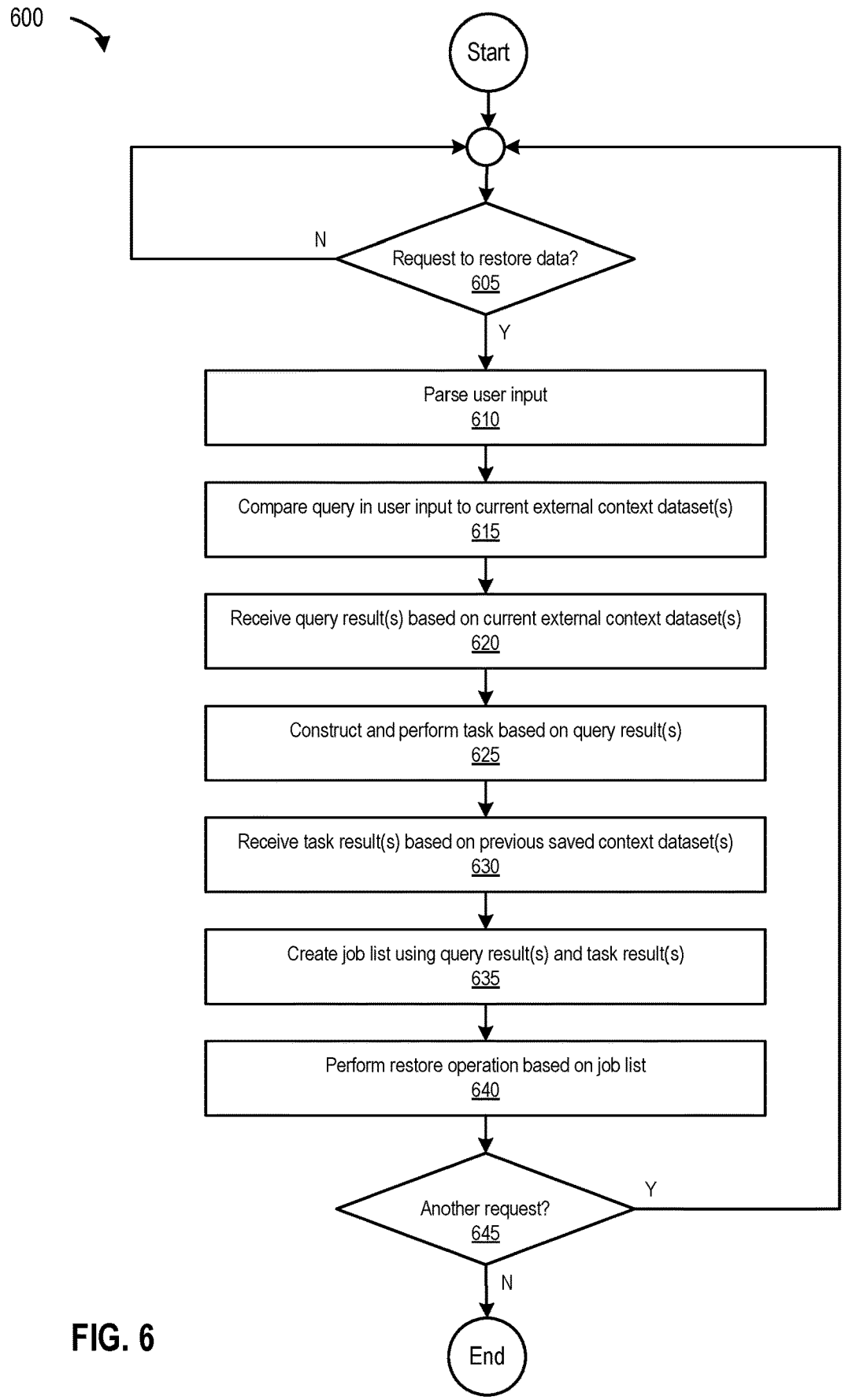
FIG. 6 is a flowchart that illustrates a process for performing a context-driven restore operation, according to one embodiment of the present disclosure.

FIG. 6 is a flowchart that illustrates a process for performing a context-driven restore operation, according to one embodiment. The process begins at 605 by determining whether there is a request to restore data (e.g., based on receiving user input 315(1) from client 305(1) in a natural language format, and the like). At 610, the process parses the user input (e.g., using orchestrator module 120). At 615, the process compares the query in the user input to one or more current external context datasets.

At 620, the process receives query result(s) based on the one or more current external context datasets. At 625, the process constructs and performs a task (e.g., a NLP-based problem statement) based on the query result(s). At 630, the process receives task result(s) based on one or more previous saved context datasets. At 635, the process creates a job list (e.g., job list 320) using query result(s) and task result(s). At 640, the process performs a restore operation based on the job list. The process ends at 645 by determining if there is another request for a recovery/restore operation.

Figure 7:
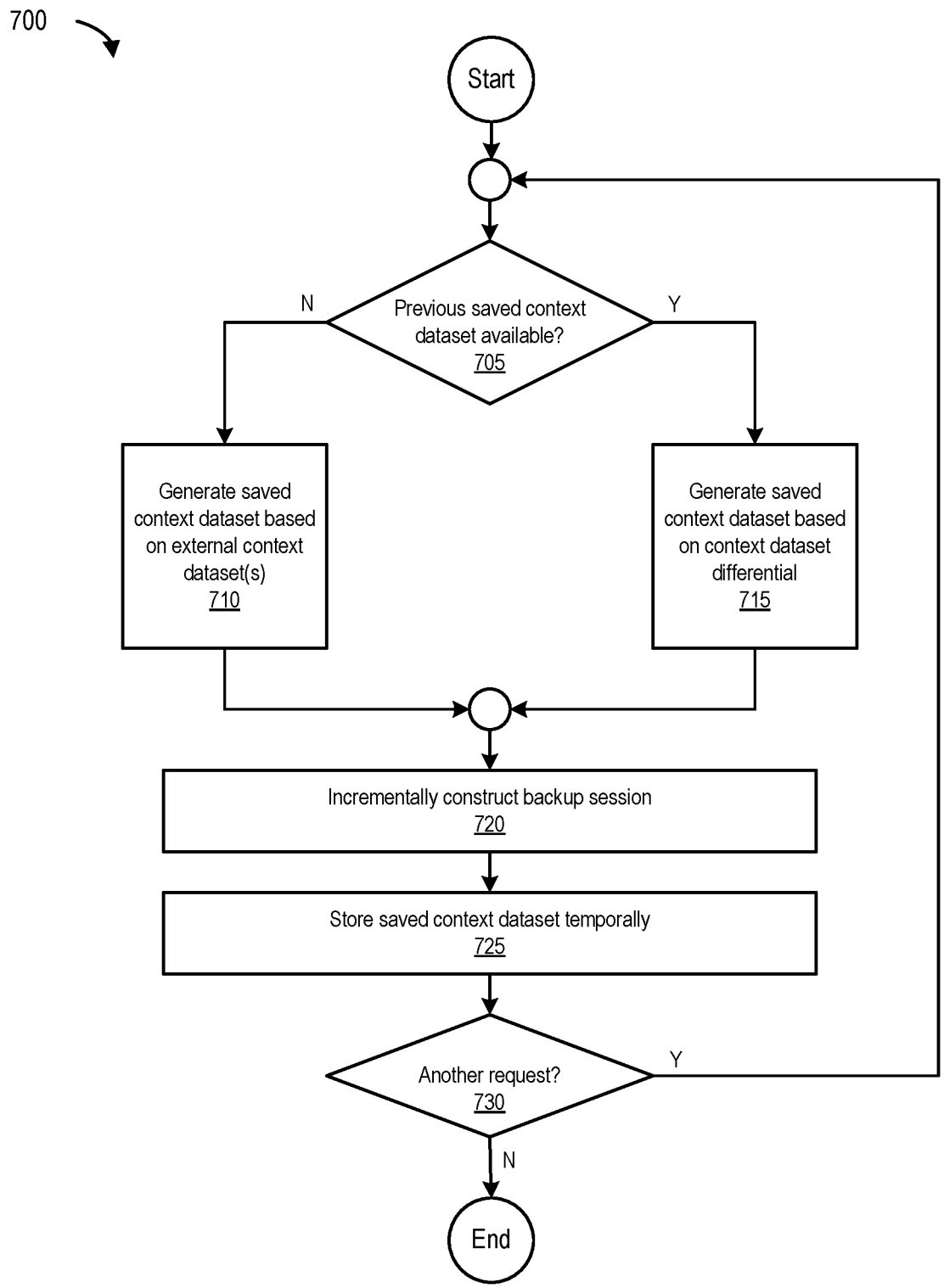
FIG. 7 is a flowchart that illustrates a process for incrementally constructing a backup session and temporally storing a saved context dataset, according to one embodiment of the present disclosure.

FIG. 7 is a flowchart that illustrates a process for incrementally constructing a backup session and temporally storing a saved context dataset as part of a backup image, according to one embodiment. The process begins at 705 by determining whether a previous saved context dataset is available. If a previous saved context dataset is unavailable, the process, at 710, generates a saved context dataset based solely on one or more external context datasets as there is no need to determine a context dataset differential. However, if a previous saved context dataset is available (e.g., in a backup image), the process, at 715, generates the saved context dataset based on the context dataset differential (e.g., difference(s) between a current external context dataset and one or more previous saved context dataset(s)).

At 720, the process incrementally constructs a backup session (e.g., in a layered fashion). At 725, the process stores the saved context dataset temporally as part of a backup image. The process ends at 730 by determining if there is another request (e.g., to perform a context-driven restore operation).

An Example Computing Environment

Figure 8:
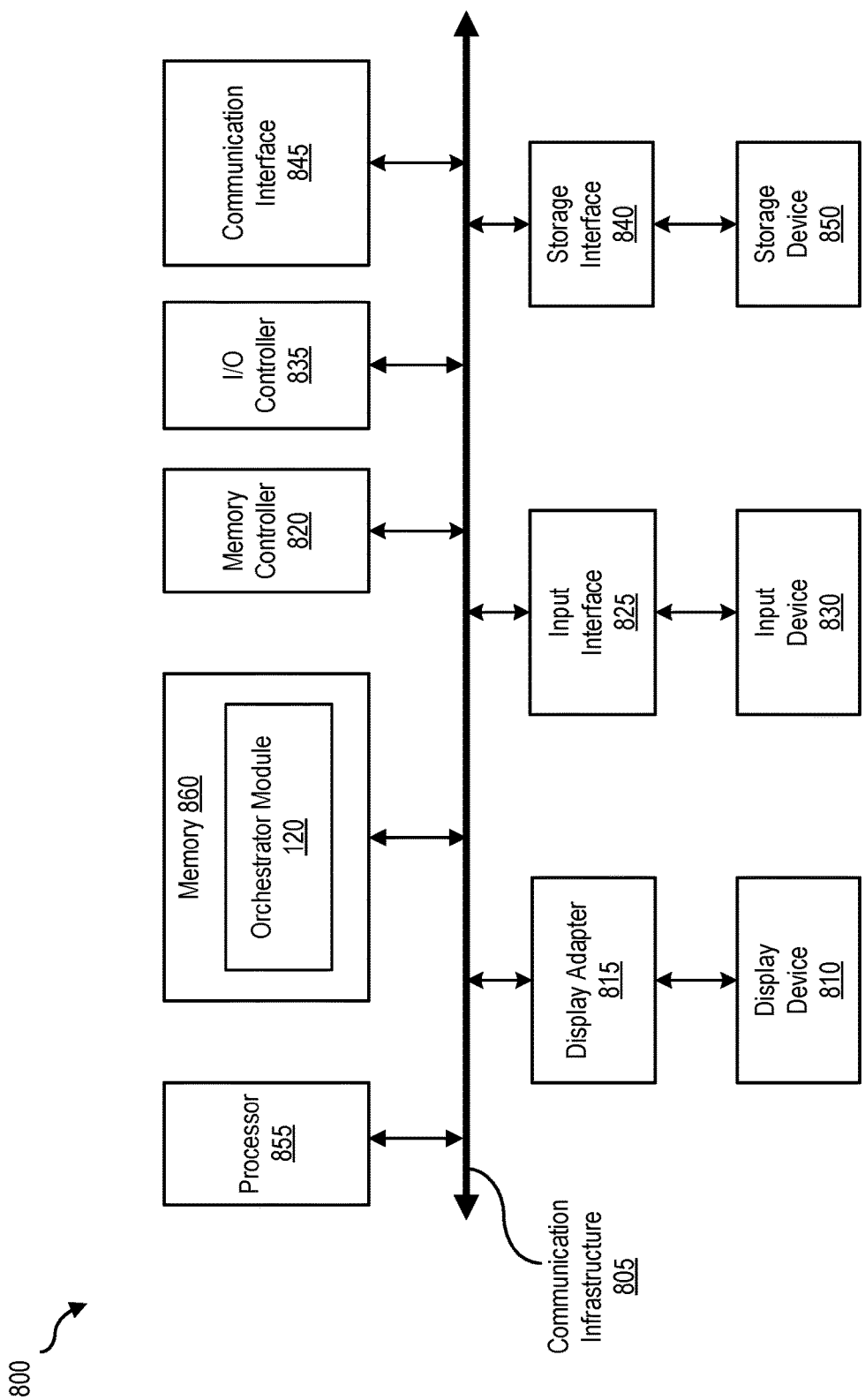
FIG. 8 is a block diagram of a computing system, illustrating the manner in which an orchestrator module can be implemented in software, according to one embodiment of the present disclosure.

FIG. 8 is a block diagram of a computing system, illustrating the manner in which an orchestrator module can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that implements backup and recovery server 115, computing system 800 becomes a special purpose computing device that is configured to perform context-driven data backup and recovery.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an orchestrator module may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtualization server and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
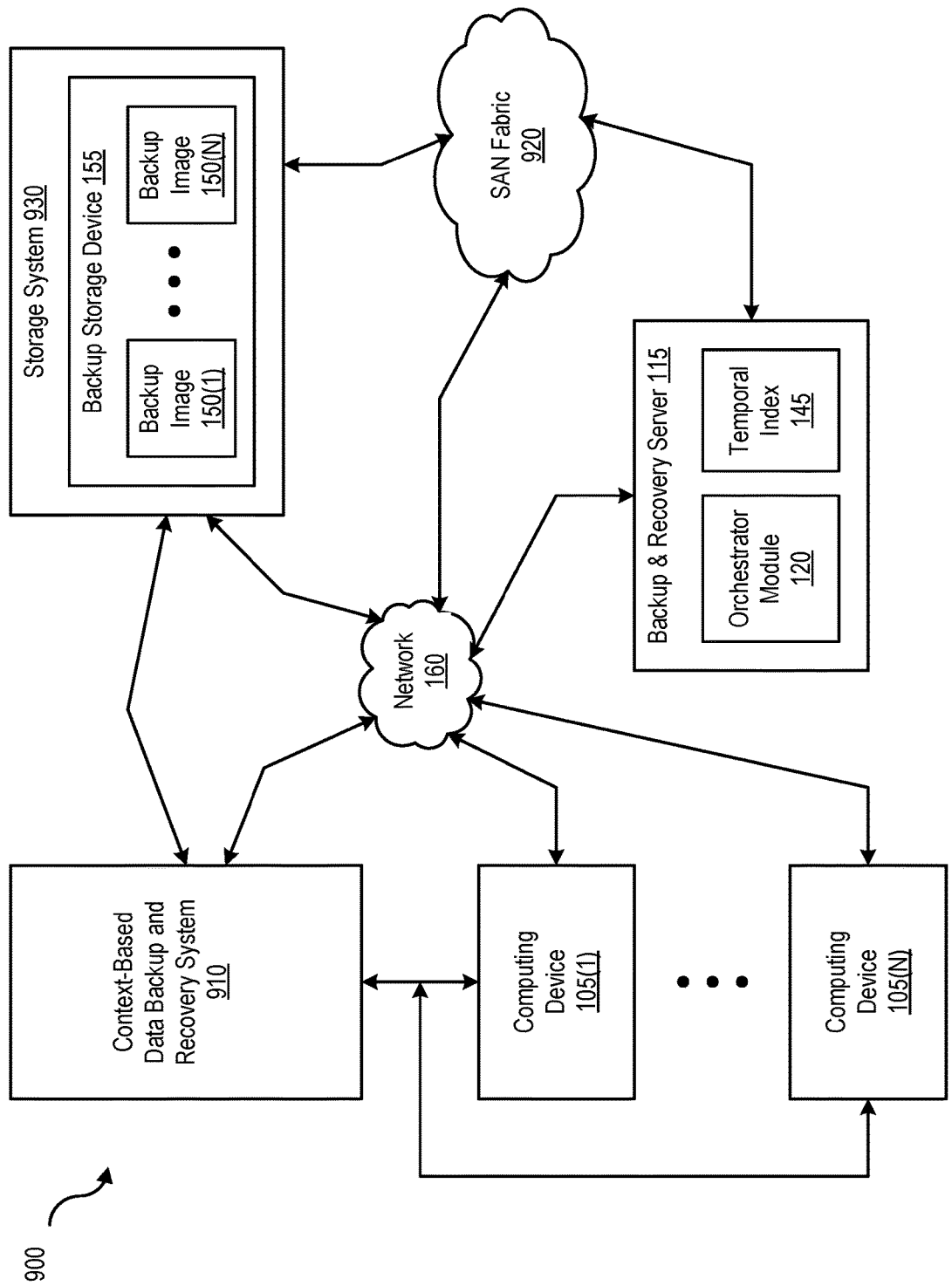
FIG. 9 is a block diagram of a networked system, illustrating how various devices can communicate via a network, according to one embodiment of the present disclosure.

FIG. 9 is a block diagram of a networked system, illustrating how various devices can communicate via a network, according to one embodiment. In certain embodiments, network-attached storage (NAS) devices may be configured to communicate with backup and recovery server 115 using various protocols, such as Network File System (NFS), Server Message Block (SMB), or Common Internet File System (CIFS). Network 160 generally represents any type or form of computer network or architecture capable of facilitating communication between computing devices 105(1)-(N) and backup and recovery server 115. In certain embodiments, a communication interface, such as communication interface 845 in FIG. 8, may be used to provide connectivity between backup and recovery server 115 and network 160. It should be noted that the embodiments described and/or illustrated herein are not limited to the Internet or any particular network-based environment. For example, network 160 can be a Storage Area Network (SAN).

In one embodiment, all or a portion of one or more of the disclosed embodiments may be encoded as a computer program and loaded onto and executed by the computing devices 105(1)-(N) and backup and recovery server 115, or any combination thereof. All or a portion of one or more of the embodiments disclosed herein may also be encoded as a computer program, stored on computing devices 105(1)-(N) and/or backup and recovery server 115, and distributed over network 160. In some examples, all or a portion of backup and recovery server 115 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, computing devices 105(1)-(N) and/or backup and recovery server 115 may transform the behavior of context-based data backup and recovery system 910 and/or backup and recovery server 115 in order to cause the context-based data backup and recovery system 910 and/or backup and recovery server 115 to perform context-driven data backup and recovery.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method of comprising:
receiving a request to restore data, wherein
the request comprises a query;
comparing the query to a current external context dataset, wherein
the comparing generates query results, and
the query results are based on the current external context dataset;
performing a task on the query results, wherein
the task comprises a natural language processing (NLP) problem statement,
the performing generates task results, and
the task results are based on a saved context dataset; and
restoring the data, wherein
the restoring is based, at least in part, on the task results.

2. The method of claim 1, wherein
the query is associated with a topic.

3. The method of claim 2, wherein
the current external context dataset was generated by applying at least a first prioritization technique to a dataset,
the current external context dataset comprises a subset of the dataset.

4. The method of claim 3, wherein
the first prioritization technique is a topic modeling technique,
the topic modeling technique is based, at least in part, on a natural language processing (NLP) methodology, and
the NLP methodology is configured to determine whether the subset is responsive to the topic, at least in part, by applying a lexical analysis technique to the dataset.

5. The method of claim 3, wherein
the current external context dataset was generated by applying at least a second prioritization technique,
the second prioritization technique is a social network data analysis technique, and
the social network data analysis technique comprises analyzing data associated with one or more users who share a social network with a given user.

6. The method of claim 3, wherein
the saved context dataset was generated by determining one or more differences between a previous saved context dataset and the current external context dataset.

7. The method of claim 1, further comprising:
generating the task, at least in part, by parsing the query.

8. A non-transitory computer readable storage medium comprising program instructions executable to perform a method comprising:
receiving a request to restore data, wherein
the request comprises a query;
comparing the query to a current external context dataset, wherein
the comparing generates query results, and
the query results are based on the current external context dataset;
performing a task on the query results, wherein
the task comprises a natural language processing (NLP) problem statement,
the performing generates task results, and
the task results are based on a saved context dataset; and
restoring the data, wherein
the restoring is based, at least in part, on the task results.

9. The non-transitory computer readable storage medium of claim 8, wherein
the query is associated with a topic.

10. The non-transitory computer readable storage medium of claim 9, wherein
the current external context dataset was generated by applying at least a first prioritization technique to a dataset,
the current external context dataset comprises a subset of the dataset.

11. The non-transitory computer readable storage medium of claim 10, wherein
the first prioritization technique is a topic modeling technique,
the topic modeling technique is based, at least in part, on a natural language processing (NLP) methodology, and
the NLP methodology is configured to determine whether the subset is responsive to the topic, at least in part, by applying a lexical analysis technique to the dataset.

12. The non-transitory computer readable storage medium of claim 10, wherein
the first prioritization technique is a topic modeling technique,
the current external context dataset was generated by applying at least a second prioritization technique,
the second prioritization technique is a social network data analysis technique, and
the social network data analysis technique comprises analyzing data associated with one or more users who share a social network with a given user.

13. The non-transitory computer readable storage medium of claim 10, wherein
the saved context dataset was generated by determining one or more differences between a previous saved context dataset and the current external context dataset.

14. The non-transitory computer readable storage medium of claim 8, further comprising:
generating the task, at least in part, by parsing the query.

15. A system comprising:
one or more processors; and
a memory coupled to the one or more processors, wherein
the memory stores program instructions executable by the one or more processors to perform a method comprising receiving a request to restore data, wherein
the request comprises a query,
comparing the query to a current external context dataset, wherein
the comparing generates query results, and
the query results are based on the current external context dataset,
performing a task on the query results, wherein
the task comprises a natural language processing (NLP) problem statement,
the performing generates task results, and
the task results are based on a saved context dataset, and
restoring the data, wherein
the restoring is based, at least in part, on the task results.

16. The system of claim 15, wherein
the query is associated with a topic.

17. The system of claim 16, wherein
the current external context dataset was generated by applying at least a first prioritization technique to a dataset,
the current external context dataset comprises a subset of the dataset.

18. The system of claim 17, wherein
the first prioritization technique is a topic modeling technique,
the topic modeling technique is based, at least in part, on a natural language processing (NLP) methodology, and
the NLP methodology is configured to determine whether the subset is responsive to the topic, at least in part, by applying a lexical analysis technique to the dataset.

19. The system of claim 17, wherein
the current external context dataset was generated by applying at least a second prioritization technique,
the second prioritization technique is a social network data analysis technique, and
the social network data analysis technique comprises analyzing data associated with one or more users who share a social network with a given user.

20. The system of claim 17, wherein
the saved context dataset was generated by determining one or more differences between a previous saved context dataset and the current external context dataset.

\* \* \* \* \*